April 2, 1946.  C. H. HARRIS  2,397,546
CAMERA SHUTTER
Filed Oct. 20, 1941  2 Sheets-Sheet 1

INVENTOR.
Clinton H. Harris
BY Strauch & Hoffman
Attorneys

April 2, 1946.　　C. H. HARRIS　　2,397,546
CAMERA SHUTTER
Filed Oct. 20, 1941　　2 Sheets-Sheet 2
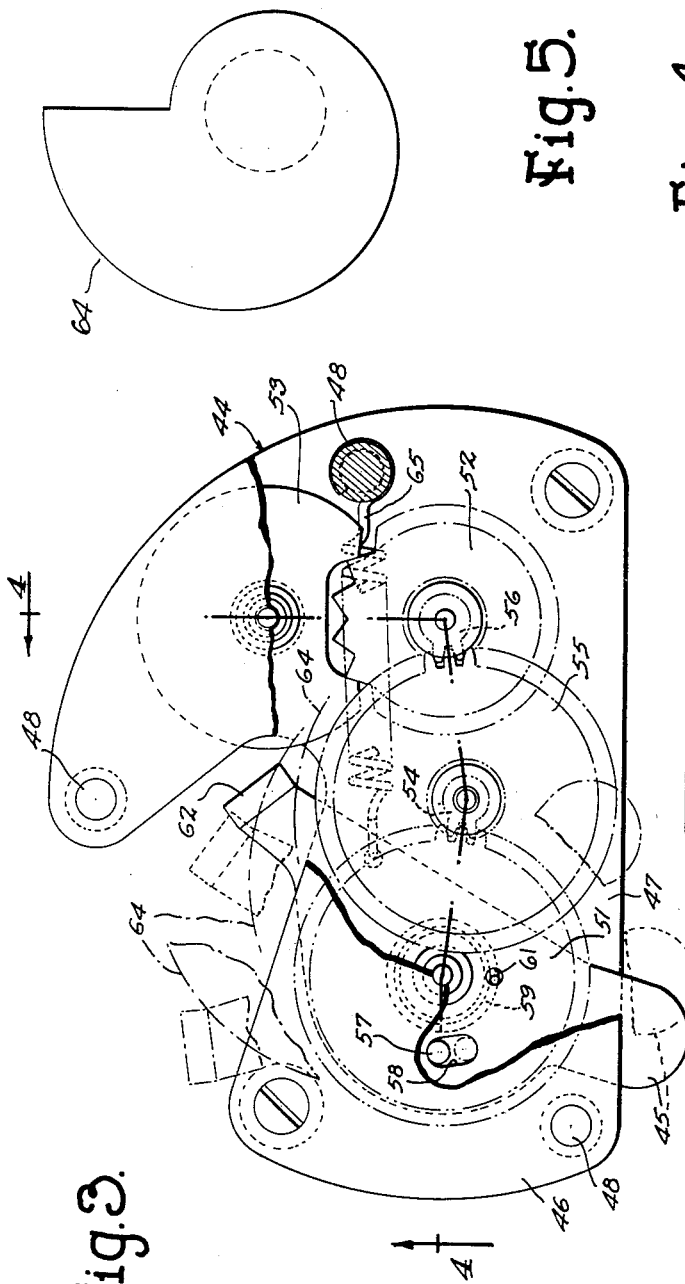
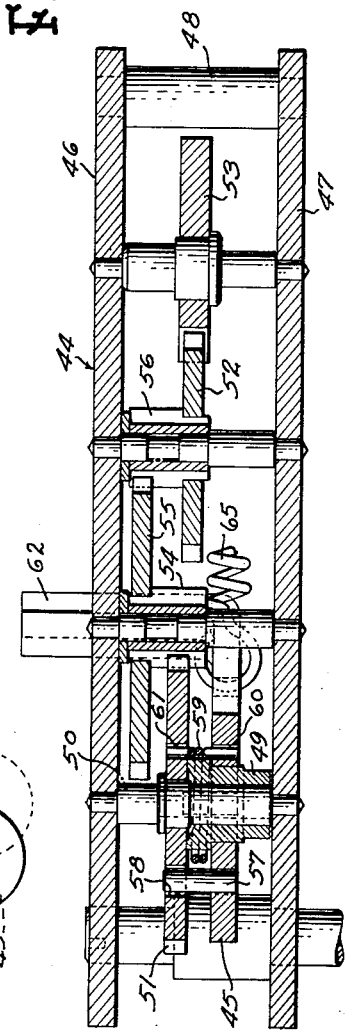
INVENTOR.
Clinton H. Harris
BY Strauch & Hoffman
Attorneys Patented Apr. 2, 1946

2,397,546

UNITED STATES PATENT OFFICE 2,397,546

CAMERA SHUTTER

Clinton H. Harris, Ann Arbor, Mich., assignor to Argus, Incorporated, a corporation of Michigan Application October 20, 1941, Serial No. 415,815

12 Claims. (Cl. 95—62)

The present invention relates to photographic camera shutters and timing mechanisms therefor. One of the objects of the present invention is to provide a new and improved camera shutter mechanism which is rugged and accurate in operation. Another object is to provide a camera shutter having an improved exposure timing mechanism. A still further object of my invention is to provide an exposure timing mechanism in which the retarding action is applied gradually. These and other objects and advantages reside in certain novel features of construction, arrangement and combination of parts as will hereinafter be more fully set forth and pointed out in the appended claims.

In the drawings:

Fig. 3 is an elevation of my improved escapement mechanism with parts broken away to show internal structure.

Fig. 4 is a section taken on line 4—4 of Fig. 3.

Fig. 5 is a front elevation of the exposure regulating cam.

Figure 1:
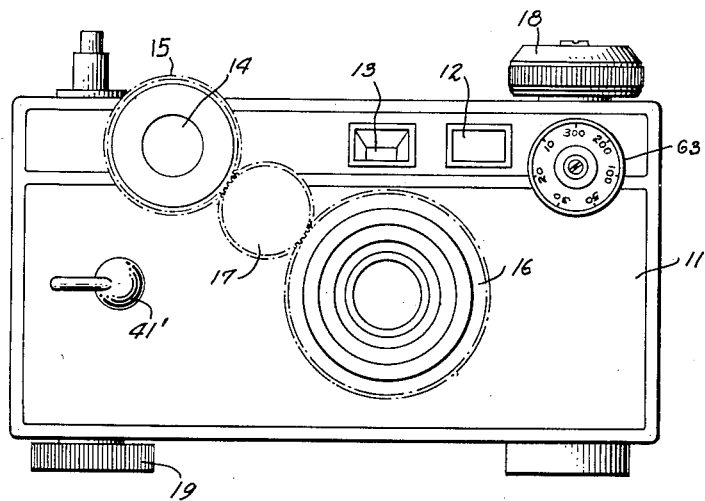
Fig. 1 is a front elevation of a camera embodying my invention.

Although my invention may be used with cameras of many different types, it is illustrated in connection with a camera of the type shown in United States Letter Patent No. 2,298,787 issued October 13, 1942. This camera comprises a body portion 10 covered by a front plate 11. This front plate has the usual finder window 12 and rangefinder windows 13 and 14. A rangefinder operating knob 15 is operatively connected to a focusing lens mount 16 by an intermediate idler gear 17. The camera is also provided with the usual winding knob 18 and the rewinding knob 19.

The camera body 10, which may be of molded plastic, has a front cavity 20 for housing the shutter and shutter actuating mechanism. A substantially circular cup portion 21 is formed on the camera body 10 within the recess 20, and the well-known blade-type shutter 22 having an actuating ring 23 is secured within this cup portion 21 by screws 24. The actuating ring 23 is operated by a pivoted trigger 25 carried on a bracket 26. As the bracket 26 moves from left to right, the trigger 25 engages a projection 27 on the ring 23 and rotates the ring 23 to open the shutter blades 28. When the shutter blades are fully open, the trigger 25 slips off the projection 27 and the ring 23 is returned to its normal position by an independent spring not shown. The blades 28 are closed during this return movement.

The bracket 26 is moved from left to right by a helical tension spring 29 which is secured at one end to a pin 30 fixed to the camera body 10 and at its other end to the bracket 26. Suitable guide surfaces 31 hold the bracket 26 in a predetermined path of movement. The bracket 26 is moved from right to left, in order to cock the shutter, by a metal strap or ribbon 32 which has one end secured to the bracket 26 and its other end fastened to a drum 33. A guide 34, which may be formed integrally with the cup portion 21, holds the ribbon 32 in its proper path of movement.

A radially projecting portion 35 is fastened to the drum 33 which terminates in two stop portions 36 and 37. A release pin 38 extends vertically through the top of the camera within the path of movement of the stop portions 36 and 37. This release pin has a transverse slot 39 adjacent one end and an intersecting transverse slot 40 at right angles to the slot 39. A spring not shown urges the release pin 38 upward. The slot 39 is wide enough to pass both the stop members 36 and 37, while the slot 40 will only pass one of these members at a time. Thus, with the stop pin in the position shown in Figure 2, an instantaneous exposure may be obtained, while rotation of the pin through 90°, so as to bring the slot 40 towards the front of the camera, will result in a bulb exposure.

Figure 2:
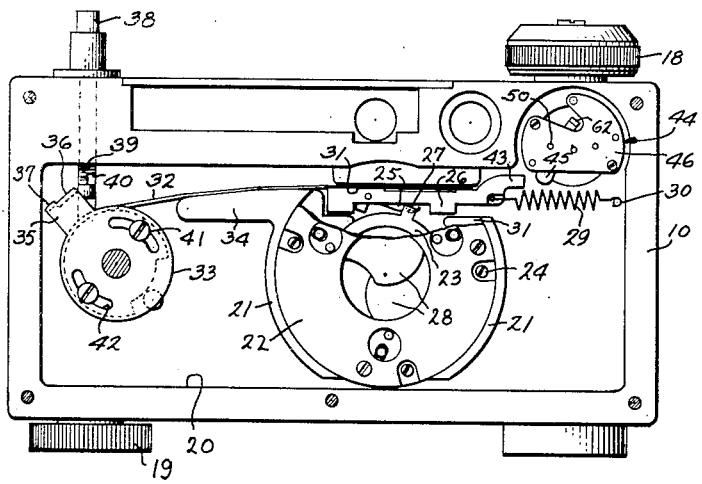
Fig. 2 is a front elevation thereof with the front plate removed.

A handle 41' on the outside of the camera is fixed to the drum 33 and the shutter is cocked by turning this handle 41' until the stop members 36 and 37 have passed the stop pin 38. This winds the strap 32 on the drum 33 and pulls the bracket 26 against the tension of the spring 29. Figure 2 shows the mechanism in this cocked position. The shutter is released by depressing the release pin 38 and bringing the slot 39 into alignment with the stop members 36 and 37. The drum 33 is then free to rotate under the action of the spring 29 and permit the bracket 26 to actuate the ring 23.

The radial portion 35 is fastened to the drum 33 by screws or bolts 41 which pass through arcuate slots 42. The position of this radial portion 35 may thus be adjusted relative to the drum 33 to insure proper positioning of the trigger 25 and bracket 26 when the shutter is in cocked position. In order to provide exposures of different time intervals, the bracket 26 is formed with a lug 43. An escapement mechanism indicated generally at 44 in Figure 2 has a timing lever 45 which projects into the path of the lug 43 as the bracket 26 moves from left to right during an exposure.

This escapement mechanism retards the movement of the bracket 26 and thus regulates the duration of the exposure.

The construction of the escapement mechanism is shown in Figures 3, 4 and 5. This escapement mechanism consists of an upper plate 46 and a lower plate 47 which are secured in spaced relation by studs 48. The timing lever 45 is fixed on a hub 49 which is rotatably journalled on a bearing 50 between the plates 46 and 47. A gear 51 is also rotatably journalled on the bearing 50 and drives the usual star wheel 52 and pallet 53 through a train of gears 54, 55 and 56. A pin 57 is rigidly secured in the timing lever 45 and projects upwardly into an arcuate slot 58 in the gear 51.

The lever 45 is also connected to the gear 51 by a coil spring 59 whose ends project through holes 60 and 61 in the lever 45 and gear 51, respectively. Ordinarily, the pin 57 occupies the full line position shown in Figure 3 against one end of the slot 58. When the lever 45 begins to move under the impact of the lug 43 on the bracket 26, the lever 45 turns against the action of the spring 59, but is not rigidly connected to the gear 51 until the pin 57 moves through the entire length of the slot 58. In this way, the full retarding action and inertia of the escapement parts are not immediately effective, but are gradually applied due to the tensioning of the spring 59. This lost motion connection between the lever 45 and the gear 51 helps to preserve the parts against undue wear and likewise helps in obtaining very slight retarding action. The amount of retarding action provided by the escapement is regulated by the position of the lever 45 in the path of the lug 43.

The lever 45 has a projection 62 which extends upwardly above the plate 46. An exposure regulating dial 63, which is rotatably mounted on the camera, carries a cam 64. This cam engages the projection 62 and moves the lever 45 to different positions in the path of the lug 43. In this way, exposures of different lengths may be readily obtained. A coil spring 65 secured at one end to the lever 45 and at the other to one of the studs 48 serves to return the lever 45 to its normal position and to hold the projection 62 against the cam 64.

From the foregoing it will be apparent that I am able to attain the objects of my invention and provide a camera shutter which is simple and rugged in construction and operation and in which the retarding action is gradually applied. While I have shown and prefer a retarding mechanism of the escapement type, it is readily apparent that my invention can be used with various types of retarding mechanism and in various types of shutters. Other modifications of form and structure can also be made without departing from the spirit of my invention or the scope of the appended claims.

I claim:

1. Camera shutter control mechanism comprising a shiftable shutter actuator, retarding means regulating movement of said actuator to control the exposure time, a pair of relatively movable members in said means, a resilient coupling between said members adapted to lightly oppose relative movement between said members, and an escapement of appreciable inertia connected to oppose movement of one of said members in a selected direction, the other of said members being positioned to be operatively engaged and moved by said shutter actuator during movement of said shutter actuator to make an exposure and means rigidly coupling said members for movement together after predetermined relative movement of said members against the opposition of said resilient coupling.

2. Camera shutter control apparatus for controlling exposure time comprising a shutter actuating member movable to make an exposure, retarding means in said apparatus, and mechanism interposed between said member and said retarding means including a pair of movably mounted relatively movable members, one of which is adapted to be displaced by said shutter actuating member during said exposure making movement and the other of which is operably connected to said retarding means, resilient means comprising a resilient connection between said relatively movable members initially opposing said displacement of said one movable member during said exposure making movement, and means subsequently operably interconnecting said relatively movable members for connecting said retarding means to oppose further exposure making movement of said shutter actuating member.

3. The camera shutter control apparatus defined in claim 2 wherein said shutter actuating member is movable in a predetermined path during said exposure making movement, and said one movable member has a part extending into said path so as to be engaged by said shutter actuating member during said exposure making movement.

4. The apparatus defined in claim 2, including means for adjustably presetting the position of one of said relatively movable members for determining said exposure duration.

5. The apparatus defined in claim 2, wherein said subsequent connecting means comprises means establishing a direct motion transmitting connection between said movable members after predetermined relative movement between said movable members.

6. Camera shutter control apparatus for controlling exposure time comprising a shiftable shutter actuating member movable to make an exposure, retarding means in said apparatus, and mechanism interposed between said member and said retarding means including two separately pivoted relatively movable members, one of which is adapted to be moved about its pivot by said shutter actuating member during said exposure making movement and the other of which is operably connected to said retarding means, resilient means interconnecting said pivoted members for relatively lightly opposing said pivotal movement of said one member during an initial phase of said exposure making movement, and subsequently acting means operably interconnecting said pivoted members for movement together for connecting said retarding means to oppose further exposure making movement of said shutter actuating member.

7. Camera shutter control apparatus for controlling exposure time comprising a shutter actuating member movable to make an exposure, retarding means, and mechanism interposed between said shutter actuating member and said retarding mechanism including a pair of relatively movable members each movably mounted in said apparatus, one of said movable members being displaced in a particular direction by said shutter actuating member during said exposure making movement, resilient means interconnecting said pair of members for opposing displacement of said one movable member in said direction initially lightly but with gradually increasing strength during a first phase of said exposure making movement and subsequently acting means then automatically connecting said movable members for displacement together in the same direction, and means operably connecting the other of said members to said retarding means whereby said retarding means is directly effective to oppose further exposure making movement of said shutter actuating member.

8. Camera shutter control mechanism comprising a shutter actuating member shiftable in a predetermined direction for making an exposure, and means for retarding movement of said member in said direction for regulating duration of said exposure comprising a first movably mounted member adapted to be moved by said exposure making movement of said shutter actuating member, a second movably mounted member in said apparatus, resilient means interconnecting said movably mounted members, means providing substantially a lost motion connection between said movably mounted members for permitting predetermined relative movement between said members opposed by said resilient means and then solidly interconnecting said members for travel together, and an escapement means operably connected to said second movably mounted member for opposing said travel.

9. Camera shutter control apparatus comprising a shutter actuating member movable in a predetermined path for making an exposure, an escapement assembly in said camera having a control lever projecting therefrom, escapement mechanism in said assembly, a shiftable member in said assembly geared to said escapement mechanism, a spring coupling interconnecting said lever and shiftable member, and a lost motion connection between said lever and shiftable member whereby the full inertia of said escapement mechanism is gradually applied without shock in opposition to exposure making movement of said shutter actuating member.

10. Camera shutter control apparatus for controlling exposure time comprising a shiftable shutter actuating member movable to make an exposure, retarding means in said apparatus, and mechanism interposed between said member and said retarding means including two separately pivoted relatively movable members, one of which is adapted to be moved about its pivot by said shutter actuating member during said exposure making movement and the other of which is operably connected to said retarding means, yieldable means relatively lightly opposing said pivotal movement of said one member during an initial phase of said exposure making movement, and subsequently acting means comprising a pin and slot connection between said pivoted members operably interconnecting said pivotal members for movement together for connecting said retarding means to oppose further exposure making movement of said shutter actuating member.

11. Camera shutter control apparatus for controlling exposure time comprising a shiftable shutter actuating member movable to make an exposure, retarding means in said apparatus, and mechanism interposed between said member and said retarding means including two separately pivoted relatively movable members substantially coaxially mounted in spaced relation, one of said pivotal members being adapted to be moved about its pivot by said shutter actuating member during said exposure making movement and the other of said pivotal members being operably connected to said retarding means, yieldable means comprising a coil spring connected at opposite ends to said pivotal members relatively lightly opposing said pivotal movement of said one member during an initial phase of said exposure making movement, and subsequently acting means comprising a pin and slot connection between said pivoted members operably connecting said pivotal members for movement together for connecting said retarding means to oppose further exposure making movement of said shutter actuating member.

12. Camera shutter control apparatus comprising a shutter actuating device movable for making an exposure, an escapement assembly in said camera embodying an escapement mechanism and a pivoted member adapted to be moved by said shutter actuating member, an independently pivoted member operably coupled to said escapement mechanism, a lost motion connection between said pivoted members, and a torsion spring interconnecting said pivoted members, whereby the full inertia of said escapement mechanism is gradually applied without shock in opposition to exposure making movement of said shutter actuating member.

CLINTON H. HARRIS.